United States Patent [19]

Jaggi

[11] Patent Number: 5,704,644
[45] Date of Patent: Jan. 6, 1998

[54] LIGHTWEIGHT ROAD VEHICLE WITH STRENGTHENING STRUCTURE

[75] Inventor: Diego Jaggi, Küsnacht, Switzerland

[73] Assignee: Esoro AG, Zurich, Switzerland

[21] Appl. No.: 517,137

[22] Filed: Aug. 21, 1995

Related U.S. Application Data

[63] Continuation-in-part of Ser. No. 201,541, Feb. 25, 1994, abandoned.

[30] Foreign Application Priority Data

Feb. 27, 1993 [CH] Switzerland .................. 583-93-1

[51] Int. Cl.⁶ .................. B62D 21/03; B62D 21/15; B60R 16/04
[52] U.S. Cl. .................. 280/796; 280/783; 280/784; 180/68.5; 180/311; 296/204
[58] Field of Search .................. 180/65.1, 68.5, 180/68.1, 89.1, 311; 280/781, 782, 783, 797, 796, 798; 296/204

[56] References Cited

U.S. PATENT DOCUMENTS

| | | | |
|---|---|---|---|
| 1,556,121 | 10/1925 | Moore | 280/106 |
| 2,814,524 | 11/1957 | Porsche et al. | 296/31 |
| 3,423,122 | 1/1969 | Wessells, III | 296/204 |
| 3,940,162 | 2/1976 | Winslow et al. | 280/781 |
| 4,014,587 | 3/1977 | Eggert, Jr. | 296/204 |
| 4,148,505 | 4/1979 | Jensen et al. | 280/784 |
| 4,174,014 | 11/1979 | Bjorksten | 180/68.5 |
| 4,216,839 | 8/1980 | Gould et al. | 180/68.5 |
| 4,355,695 | 10/1982 | Leskovec | 180/68.5 |
| 4,365,681 | 12/1982 | Singh | 180/68.5 |
| 4,402,545 | 9/1983 | Utsunomiya et al. | 296/204 |
| 5,129,700 | 7/1992 | Trevisan et al. | 296/204 |
| 5,156,225 | 10/1992 | Murrin | 180/68.5 |

FOREIGN PATENT DOCUMENTS

| | | | |
|---|---|---|---|
| 444975 | 9/1991 | European Pat. Off. | 180/65.1 |
| 554889 | 8/1993 | European Pat. Off. | |
| 574281 | 12/1993 | European Pat. Off. | |
| 1060250 | 3/1954 | France . | |
| 2391893 | 12/1978 | France . | |
| 2684606 | 6/1993 | France . | |
| 2684950 | 6/1993 | France . | |
| 2522844 | 12/1976 | Germany | 180/68.5 |
| 2644666 | 4/1977 | Germany . | |
| 237605 | 10/1925 | United Kingdom . | |
| 677456 | 8/1952 | United Kingdom . | |
| 1179282 | 1/1970 | United Kingdom | 180/68.5 |
| WO 92/20563 | 11/1992 | WIPO . | |

*Primary Examiner*—Paul N. Dickson
*Attorney, Agent, or Firm*—Walter C. Farley

[57] ABSTRACT

A supporting structure for a lightweight vehicle has a central cross tube (10) extending across the vehicle under driver's and occupant's seats. The tube has an enclosed volume formed from a floor plate (14), a top plate (11), a front wall (12) and a rear wall (13). The ends of the cross tube are fixedly attached to longitudinal support members (21, 22), forming a lightweight, rigid and safe structure. The cross-section of the central cross tube is made large (at least 15×25 cm) to absorb side impact forces and can contain traction power batteries which results in good weight distribution. Side rings define door openings and are rigidly attached to the cross tube and longitudinal support structure and to transverse roof struts to form a complete passenger enclosure.

20 Claims, 4 Drawing Sheets

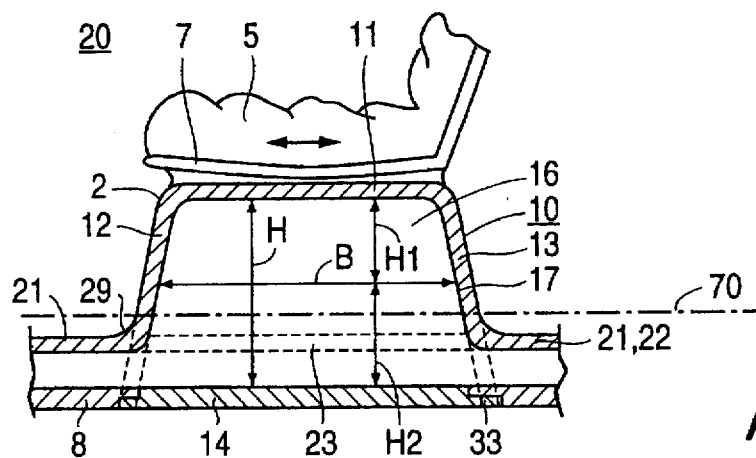
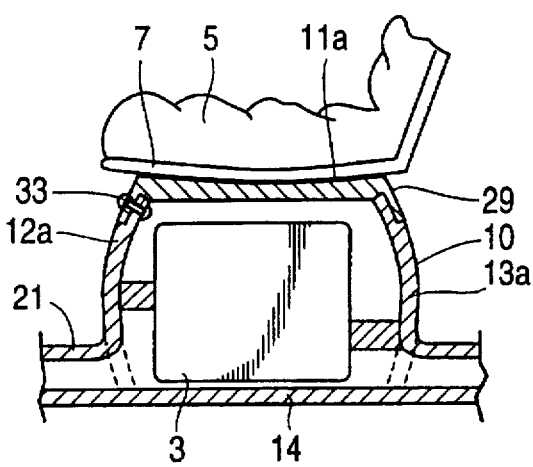
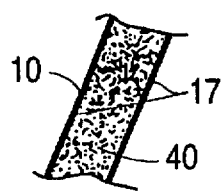
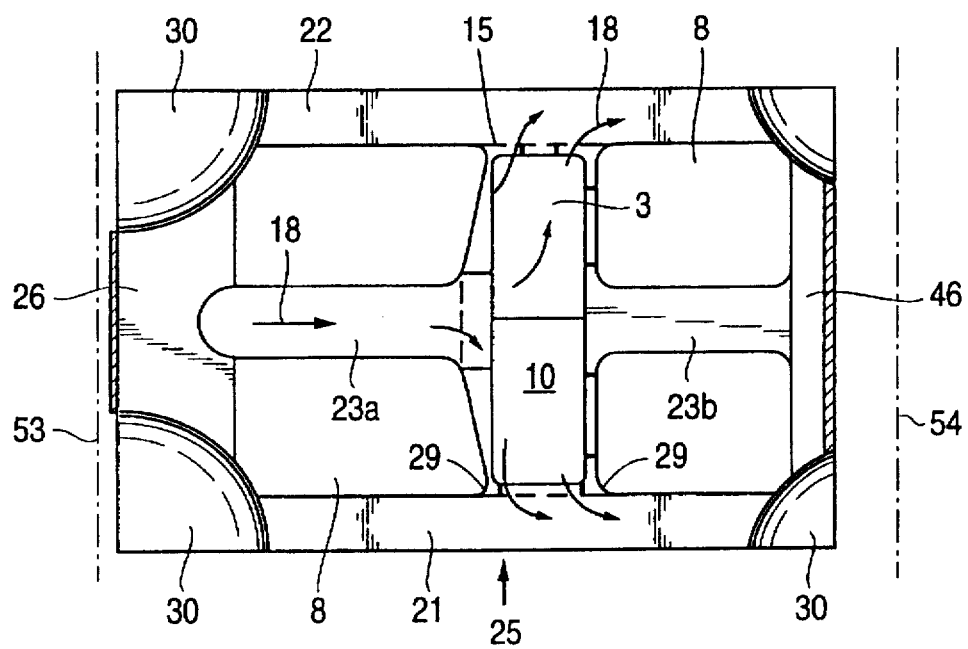

LIGHTWEIGHT ROAD VEHICLE WITH STRENGTHENING STRUCTURE

CROSS-REFERENCE TO RELATED APPLICATION

This is a continuation-in-part of application Ser. No. 08/201,541 filed Feb. 25, 1994 and now abandoned.

FIELD OF THE INVENTION

This invention relates to a supporting structure for a lightweight road vehicle having an energy accumulator, in particular to an electrically powered motorcar with batteries for traction power and with adjacent driver's and passenger's seats.

BACKGROUND OF THE INVENTION

Vehicles of this general type have sometimes become known as electrical microcars and have been very simply built and have not exhibited good driving performance. As a result, they cannot keep pace with traffic outside of low-speed urban areas and therefore constitute a traffic hindrance. They have been characterized by simple and comparatively weak construction which provides little passive safety and their heavy batteries, whose weight distribution is poor, also lead to poor driving quality as a result. The active and passive safety of these known vehicles is thus still inadequate, especially at higher speeds.

SUMMARY OF THE INVENTION

An object of the present invention is to provide a supporting structure in a lightweight vehicle which provides improved driving performance and an ability to fully keep pace with other traffic and which provides considerable improvements in occupant safety, particularly protection against impacts against the sides of the vehicle. Additionally, better driving quality is achieved, as compared with the prior art, while enabling safe driving at higher traveling speeds.

The foregoing is achieved in accordance with the invention by providing a lightweight vehicle having wheels and a supporting structure including a cross tube beneath driver's and passenger's seats and longitudinal side members forming, in plan view, an H-shaped structure containing a plane intersecting the wheels of the vehicle with at least part of the cross tube above a plane containing the wheel axles. The cross-tube has a sufficiently large enclosed cross-section so that it can absorb significant side impacts without buckling and can also contain one or more batteries. The cross tube has top, bottom, front and rear walls, at least three of the four tube walls being interconnected with each other and the ends thereof being connected to the side members. The cross tube is positioned at a level approximating the vertical height above the ground of automobile bumpers so that side impacts can be effectively resisted or absorbed.

An important aspect of the structure of the present invention is that the cross tube has a large enclosed cross-section with a height of at least 15 cm and a width of at least 25 cm which provides for sufficient strength to accomplish the above functions and the position of the cross tube below the occupants' seats results in a light weight, high strength and rigid structure which is effective particularly in the vulnerable central region of the vehicle. The relatively large interior space of the cross tube creates an ideal place deep in the center of the vehicle for housing heavy components, particularly the energy accumulator. It is therefor particularly advantageous to accommodate a large proportion of the energy accumulator in the cross tube to support and restrain it securely so that, in the event of a collision, it cannot penetrate the seating compartment of the vehicle.

Another important feature of the invention is the provision of side support rings attached to, or forming part of, longitudinal side support members which are firmly connected to the cross tube and additional transverse struts so as to create a passenger-protecting support system.

BRIEF DESCRIPTION OF THE DRAWINGS

The foregoing and other advantageous features of the invention are described in detail with reference to the following drawings wherein:

FIG. 1 is a partial side elevation, in section, of a light weight vehicle in accordance with the invention;

FIG. 2 is a schematic top plan view of a support structure in accordance with the invention;

FIG. 3 is a partial side elevation of a cross tube in accordance with the invention with rounded front and rear walls;

FIG. 4 is an enlarged sectional view of a sandwich wall;

DESCRIPTION OF THE PREFERRED EMBODIMENTS

Figure 5:
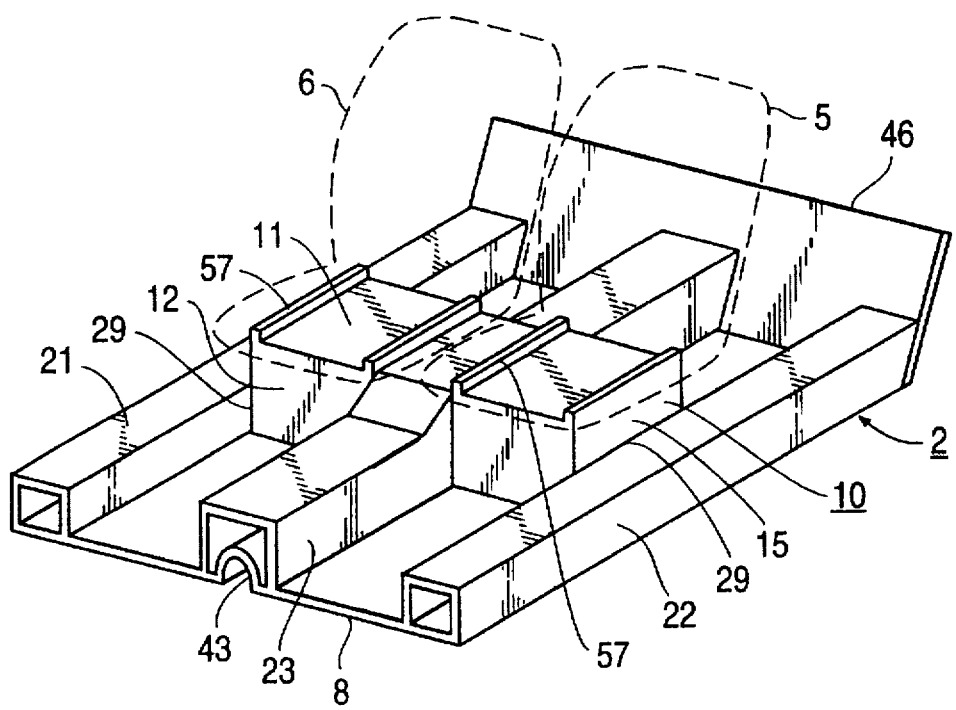
FIG. 5 is perspective view of a support structure in accordance with the invention in relation to the occupants' seats.

FIGS. 1 and 2 show partial side and top plan views, respectively, of a light weight vehicle having a cross tube arranged under and carrying the driver's and passenger's seats 5 and 6, the cross tube extending essentially across the width of the vehicle. The cross tube has a top plate 11, a front wall 12, a rear wall 13 and a bottom wall or floor plate 14 which together enclose an interior volume. Opposite ends of cross tube 10 are attached to two longitudinally extending support members 21 and 22 which are located at the sides of the vehicle, forming a support structure 2. Support members 21 and 22 are also preferably in the form of tubular members with enclosed volumes.

Figure 6:
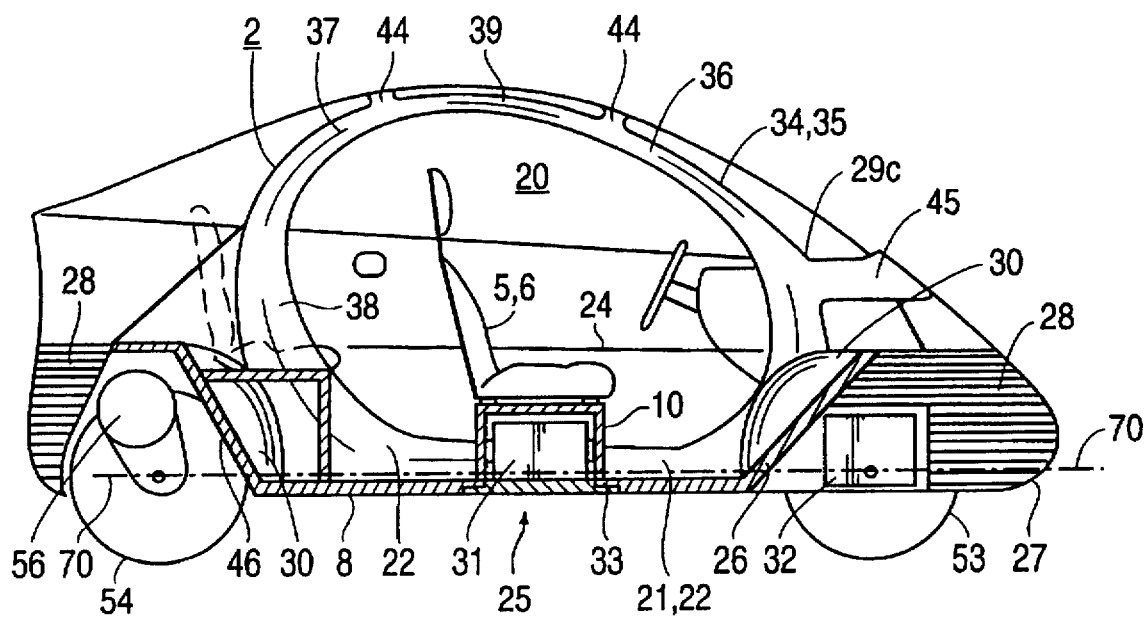
FIG. 6 is a schematic side elevation, partly in section, of a light weight vehicle in accordance with the invention with side structural rings, front wall, rear wall and central cross tube.
Figure 7:
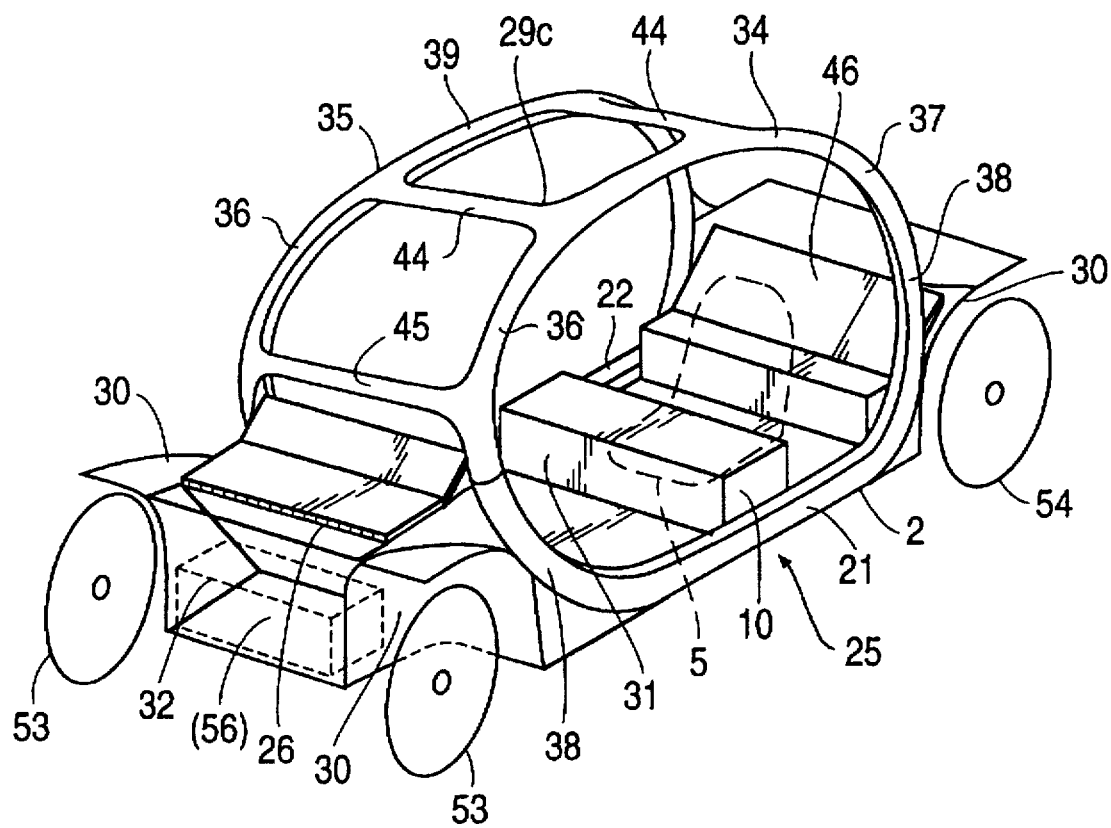
FIG. 7 is a schematic perspective view of the vehicle of FIG. 6 with some exterior body panels removed.

As seen in FIG. 2, support structure 2 can also include a central longitudinal support members 23a and 23b in addition to members 21 and 22. Cross tube 10 is thus supported at the front and back as well as at the ends by members 21, 22 and 23. The junctions between the force members are formed as force transmitting junctions 29 and can be, for example, in the form of reinforced, rounded transition pieces to ensure that the forces acting on any of the members of support structure 2 are transmitted to all connected elements of the support structure. Cross tube 10 is formed so that it has a large cross-section with a height of at least 15 cm and a width of at least 25 cm, although the height can be in the range of about 15 to about 25 cm and the width can be in the range of about 25 to about 40 cm. This large cross-section provides several significant advantages:

The large cross-section of the cross tube provides considerable reinforcement and stiffening of support structure 2, especially in the central region indicated by arrow 25 in FIGS. 2, 6 and 7 between front and rear wheels 53, 54, which is a particularly weak region in existing road vehicles.

A storage area is created by the cross tube in the center of the interior space of the vehicle where there was previously no free space available. This means that heavy vehicle components can be housed in the cross tube, particularly parts of the energy accumulator such as storage batteries. This provides an ideal location, low in the vehicle to keep a low center of gravity and also centrally positioned, which leads to improved driving characteristics. In existing battery-powered vehicles, batteries must be housed at the rear or the front of the vehicle or even on top of the motor. This makes the front or rear very heavy and results in correspondingly poor performance and dangerous reactions during sudden changes of direction. Batteries which are in a high position raise the center of gravity to an undesirable degree.

Energy accumulators accommodated inside the cross tube are supported at the front and back by the front and back walls 12 and 13, respectively. The batteries are thereby prevented from being thrown into the seating compartment in the event of a collision, which phenomenon has in the past represented a dangerous problem in light weight cars.

The interior space 16 of cross tube 10 is hermetically sealed from the seating compartment by the connecting parts including cover plate 11, front wall 12 and rear wall 13. As a result, in the event of a defect in the energy accumulator, generally harmful, corrosive or explosive substances that might exist are kept away from the passengers.

An energy accumulator, shown as a battery 3, can itself also be used for the diagonal reinforcement of the structure as it is supported by the side walls 15 of the cross tube.

A further advantage of the structure in accordance with the invention is that the cross tube can be ventilated as shown by arrows 18, FIG. 2, for the purposes of thermal conditioning for optimal operation of a storage battery in a simple manner by conducting cooling air through longitudinal channels 21, 22 and 23 of the support structure.

The enclosed cross-section of the cross tube may be, for example, square, rectangular, trapezoidal or rounded and the cross tube may taper from the middle to each side. Whatever shape is selected, it is the essential that it have smooth transitions from one part to another to assure good transmission of forces to adjacent parts such as other parts of the support structure (longitudinal sections) as well as the floors, etc. of the vehicle through the force transmitting junctions 29, 29c as shown in FIGS. 1–3, 5, 6, 9 and 10.

FIG. 3 shows an example of a cross tube having rounded walls 12a and 13a and also a seat shell firmly integrated with a top plate 11a. The firm connection of the seat shell to top plate 11a adds to the stiffening and reinforcement of the cross tube. The seat shell can thus be fixed in position or can be adjustable by the use of, for example, adjustable rails 57 such as are shown in FIG. 5 on which the seats can be moved forward or backward. Floor plate 14 of the cross tube can be detachable to permit simple removal of the battery, as shown in FIG. 1, or the bottom plate can be fixed and the top plate 11 can be removable as shown in FIG. 3. With either of these techniques, an ideal force transmitting connection to the vehicle floor 8 or to walls 12 and 13 is produced by suitably shaping interlocking plate edges, forming force transmitting junctions such as 29 and 33.

Figure 8:
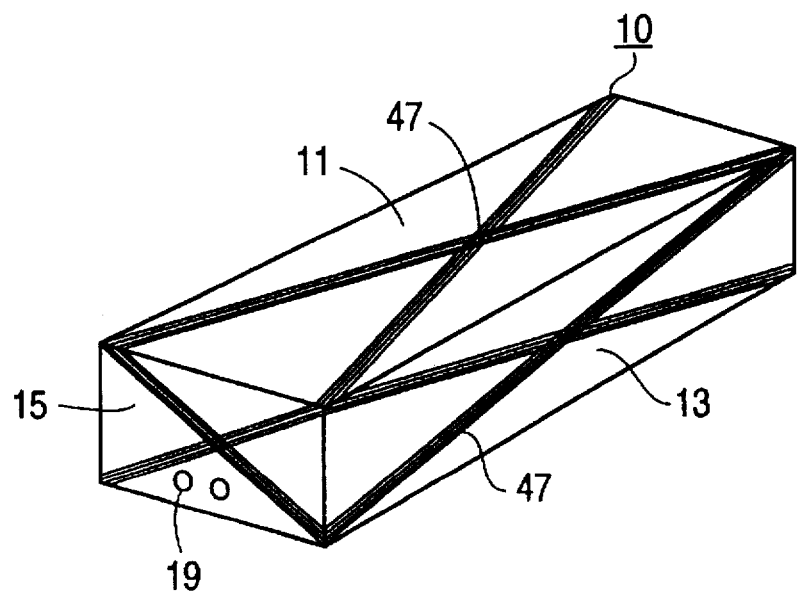
FIG. 8 is perspective view of a cross tube with end walls and integral reinforcing chords.

A light and rigid cross tube with a particularly high buckling strength can be constructed using relatively thick or double-skinned or sandwich type walls for the cross tube. FIG. 4 shows such a sandwich wall 17 with two outer layers made, for example, from fiber-reinforced composite materials between which is interposed a lightweight support core which can be a foamed or honeycomb material. FIG. 8 shows a particularly light and rigid cross tube 10 which has side walls 15 provided with ventilation holes 19. The cross tube is made with integrated latticework-like diagonal reinforcements 47 which can be carbon ribbons laminated into fiber composite walls.

FIGS. 6 and 7 show a light weight vehicle with a supporting structure in accordance with the invention. The under-body with a floor 8, cross tube 10 and laterally positioned, longitudinally extending support members 21 and 22 is connected with front and rear wheel housings 30, the vehicle body also having an inclined, transverse front wall 26 and a transverse rear wall 46. This is supplemented by two structural rings 34 and 35, one at each side of the vehicle. The structural rings are interconnected at locations spaced from the longitudinal support members by transverse roof struts 44 and a front windshield transverse strut 45. Side rings 34 and 35 merge into longitudinal supports 21 and 22 and, together with the struts, define front and rear windshield frames 36 and 37 and a door frame 38. The structural rings and struts which are interconnected by force-transmitting transition junctions 29c which are formed securely so that any forces are distributed to the various members of the entire structure. The resulting supporting space structure is light, very strong and quite rigid and is also particularly strong at the sides to provide greatly increased occupant protection.

It will be noted that the longitudinal side members can advantageously be part of the side rings in the sense that the side rings are formed as generally circular, hollow or foam-filled, double-walled strength members with the bottom portions thereof slightly straightened to constitute longitudinal members 21 and 22 which are firmly laminated, welded or otherwise fixedly attached to the ends of cross tube 10. Together with the other transverse struts 44 and 45, this structure forms a passenger-enclosing and protecting cage-like assembly providing great strength and resistance to deformation in the event of side, front or rear impacts.

Figure 9:
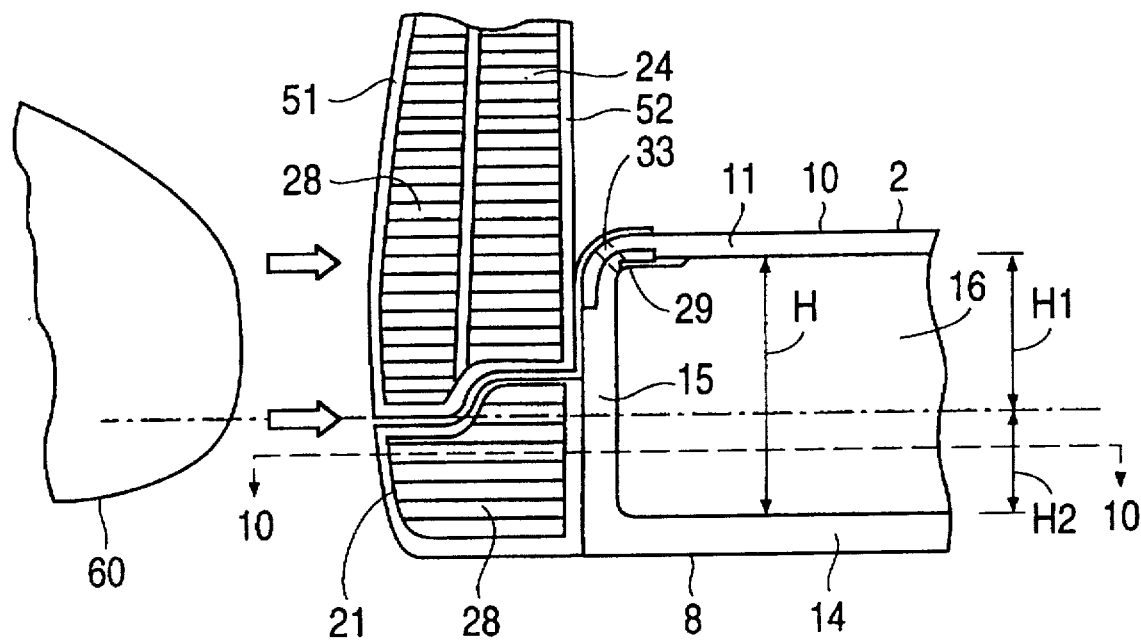
FIGS. 9 and 10 are schematic examples of double-skinned doors connected to a cross tube and lower longitudinal sections.

As will be seen in FIG. 6, the cross tube is in the central region 25 and is at a height of the vehicle which is substantially the height of bumper portions at the front and rear which is also the height of the bumpers of other vehicles, usually at a height corresponding to the upper halves of the vehicle wheels. The cross tube and side members, are thus positioned not merely to stiffen the floor of the vehicle but to form an impact-resistant structure and are thus positioned at a height at which impact forces are likely to occur. Cross tube 10 is dimensioned much larger than side members 21, 22 and extends upwardly somewhat farther than the upper extent of the side members. A substantial portion of the cross tube is positioned above the plane 70 of the wheel axles of the vehicle, as shown in FIG. 6, although the top of the cross tube would normally be below the upper limits of the vehicle tires. Preferably, at least half of the cross tube 10 is positioned above the plane 70 of the wheel axles, as is shown in FIGS. 1 and 9 where H1 is larger than H2 with the total height H=H1+H2.

The entire front of the vehicle is designed as a crushable zone. The vehicle nose is filled with an impact- and energy-absorbing material 28 which is supported on the one hand directly by supporting structure 2 and on the other and by a part 32 of the energy accumulator or its housing. This part 32 is located on vehicle floor 8 and is directly in front of inclined front wall 26. In the event of a head-on collision, the energy absorbing nose crumples and, if the impact is sufficiently severe, the energy accumulator is pushed diagonally down by front transverse wall 26 so that it passes under the seating compartment or, stated differently, the seating compartment rides over the accumulator. Thus, the largest possible region of deformation is created without the supporting structure, including side rings 34 and 35, crumpling. Similarly, a rear transverse wall 46 which slopes upwardly and rearwardly can be provided so that, in the event of rear impact, portions of the drive system such as drive unit 56 (FIG. 6) are compelled to move diagonally downwardly under wall 46.

FIG. 6 also shows the favorable, balanced weight distribution of low-lying heavy components which is achieved by the combination of features described herein, particularly of the battery or batteries 31 in the center 25, the battery section 32 nearest the front axle and the rear drive 56 carried primarily by the rear axle. As an example, a 2+2 seater light weight, electric vehicle with a supporting structure in accordance with the invention and with reliable drive components can achieve peak speeds up to 120 km/hr. The tare weight is only 550 kg of which 60 kg is taken up by the supporting structure, 100 kg by each of the battery units 31 and 32 and 60 kg by the drive unit with axles. For a front wheel drive, sections 32 and 56 can easily be exchanged. A front drive 56 for such a vehicle can, for example, include an electric motor and an internal combustion engine.

Light weight vehicles in accordance with the invention with a highly stable supporting structure may also have other energy stores and drive types, the heavier components preferably being accommodated in cross tube 10. Hybrid vehicles with combined types of drives (thermal and electrical, in particular) are especially feasible. In addition to electric drives, fuel cells and thermal drives, such as gas engines, Sterling engines and small gas turbines, can be fitted. Energy stores, in addition to electro-chemical units, such as hydrogen-metal hybrid accumulators, gas accumulators, alcohol accumulators, etc., can be used. FIG. 5 shows an additional open half-pipe 43 in longitudinal section 23 to contain an exhaust pipe from front to rear.

Figure 10:
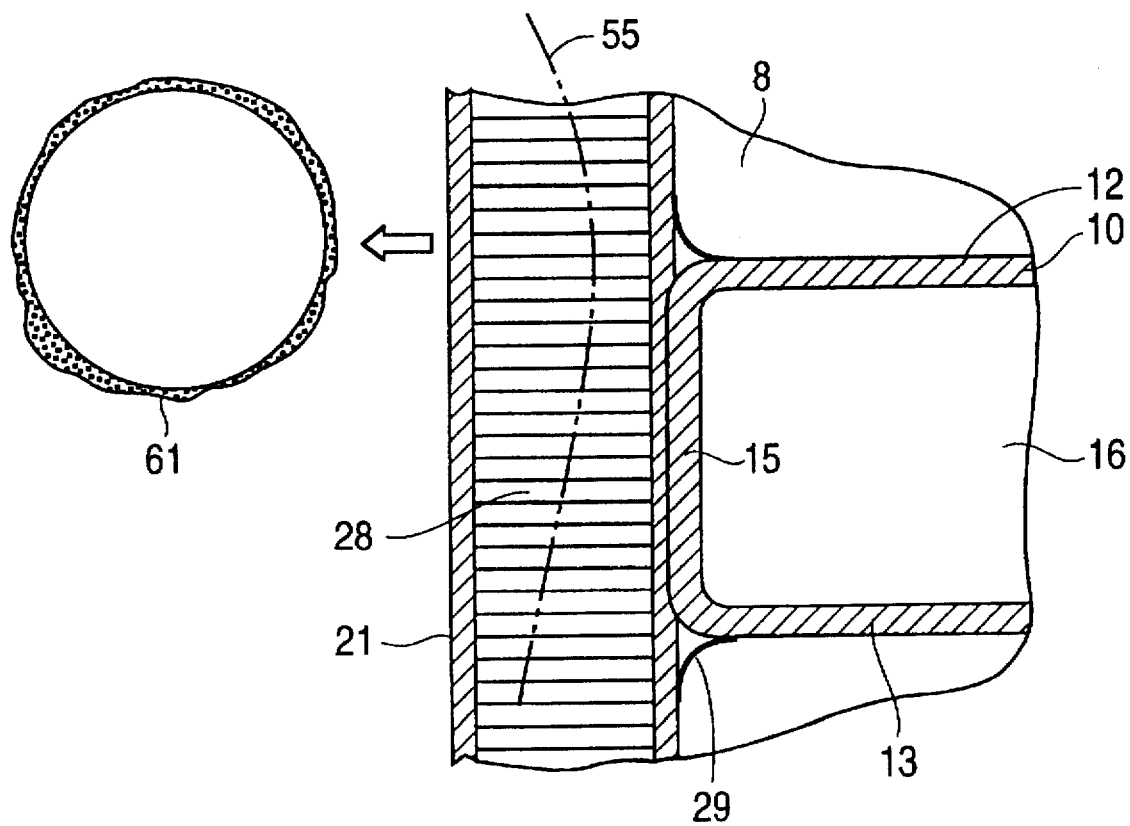

FIGS. 9 and 10 illustrate two views illustrating the particularly high lateral strength of the structure in accordance with the invention due to its construction and to the comparatively low tare weight of the light weight car. To the side of and immediately abutting cross tube 10 is a longitudinal floor-level support member 21 and above that is a double-skinned door with outer and inner shells 51 and 52. With this construction, the longitudinal support members and the doors can act as a crusher zone and at the same time transmit lateral impact forces to rigid cross tube 10. For further reinforcement and energy absorption, the doors and longitudinal members 21, 22 can be filled with energy-absorbing material 28. Tubular plates and foam material oriented in the direction of impact, for example, are suitable as such material.

FIG. 9 illustrates a typical side-on collision by a vehicle 60. Essentially, the front or the height of the bumpers of such a vehicle correspond to the elevation of the cross tube, which means that the tube can effectively prevent the passenger compartment from crumpling. Here also, a substantial part H1 of cross tube 10 lies above plane 70 containing the wheel axles. FIG. 10 shows a horizontal section along line A—A illustrating a particularly hazardous side-on collision with a tree 61. Because of the transverse, central location of cross tube 10 between the front and rear wheels, even this impact is largely absorbed by the cross tube and supported by the entire supporting structure 2 so that it does not buckle.

The likely deformation of a crumpled outer shell of longitudinal section 21 and door 24 is shown by line 55. This illustrates the transmission of damped forces and the distribution of forces to and on cross tube 10. In existing road vehicles, with their comparatively low lateral strength in relation to their high tare weight without the high-strength cross-tube structure in accordance with the invention, the interior space of the vehicle is unavoidably and extensively crushed with the most serious consequences for the occupants of the front seats in the event of a side-on collision with a narrow pillar or tree.

Fiber-composite materials i.e., with industrial endless fibers made of glass, carbon or aramid reinforced plastics, for example epoxides or polyester in the form of duroplastics and thermoplastics are particularly suitable as materials for supporting structure 2. Light metals, especially aluminum alloys, or combinations of fiber-composite materials and light metals, may also be used.

What is claimed is:

1. A lightweight road vehicle having an inner passenger space with laterally adjacent driver's and passenger seats, wheels, an energy accumulator (3, 31, 32), an electric motor, and a support structure (2) comprising the combination of a cross tube (10) extending transversely of a normal direction of forward travel of the vehicle within and entirely through said inner passenger space and located beneath and carrying said driver's and passenger seats (5, 6) in a central region of said vehicle between front and rear axles thereof, said tube having a large enclosed interior cross-section with a height of at least 15 cm and a width of at least 25 cm, and including a floor plate (14), a top plate (11), a front wall (12) and a rear wall (13) forming tube walls, at least three of said four tube walls (11, 12, 13, 14) being interconnected, at least part of said cross tube extending above a plane (70) containing axles of said wheels, and a portion of one of said floor plate (14) or said top plate (11) of said cross tube being detachable;

said support structure further including at least two side support members (21, 22) extending longitudinally at opposite sides of said vehicle; and force-transmitting junctions (29) interconnecting said cross tube and said side support members, said cross tube (10) housing at least part of said energy accumulator.

2. A vehicle according to claim 1 wherein an interior space of said vehicle is hermetically sealed by said top plate (11), said front wall (12) and said rear wall (13) from said interior (16) of said cross tube (10).

3. A vehicle according to claim 1 wherein at least part of said cross tube walls is double-skinned (17) forming a sandwich construction.

4. A vehicle according to claim 1 wherein said cross tube has side walls (15) and reinforcements (47) forming a latticework.

5. A vehicle according to claim 1 wherein said driver's and passenger's seats include seat shells (7) connected to and reinforcing said top plate.

6. A vehicle according to claim 1 and further comprising double-skinned doors (24), said doors and said longitudinally extending support sections (21, 22) being positioned immediately adjacent said cross tube (10), said doors and longitudinal sections containing energy-absorbing material (28).

7. A vehicle according to claim 1 and further including a central longitudinal special section tube (23) supporting said cross tube at said front of said vehicle.

8. A vehicle according to claim 1 wherein ventilation (18) is provided through said longitudinal sections (21, 22, 23) and said cross tube.

9. A vehicle according to claim 8 and further including a front transverse wall (26) of said support structure ascending diagonally at said front, said transverse wall being connected to said cross tube by wheel casings (30) and said longitudinal sections (21, 22, 23).

10. A vehicle according to claim 9 and having a vehicle nose (27) forming a crush zone in front of said front wall, said nose being at least partially filled with energy-absorbing material (28).

11. A vehicle according to claim 9 wherein parts of said energy accumulator (32) are arranged on a vehicle floor (8) and in front of said front wall (26).

12. A vehicle according to claim 9 wherein said support structure (2) includes two lateral structural rings (34, 35), comprising windscreen frames (36, 37), door frames (38), a roof frame (39) and said longitudinal sections (21, 22) which are connected with said cross tube and said transverse front wall.

13. A vehicle according to claim 12 wherein at least one transverse roof section (44), one front windscreen section (45), one rear transverse wall (46) and one vehicle floor (8) are connected with said lateral structural rings (34, 35).

14. A vehicle according to claim 1 wherein said supporting structure (2) consists at least partially of fiber composite materials.

15. A vehicle according to claim 1 wherein said supporting structure is made of light metal.

16. A vehicle according to claim 9 wherein a part of said energy accumulator is located on a vehicle floor and behind a rear transverse wall (46).

17. A vehicle according to claim 1 wherein at least half (H1) of said cross tube extends above said plane (70) containing said wheel axles.

18. A lightweight road vehicle having an inner passenger space with laterally adjacent driver's and passenger's seats, said vehicle having wheels, an energy accumulator (3, 31, 32), an electric motor, and a support structure (2) comprising the combination of a cross tube (10) extending transversely of a normal direction of forward travel of the vehicle within and entirely through said inner passenger space and located beneath said driver's and passenger seats (5, 6) in a central region of said vehicle between front and rear axles thereof, said tube having a large enclosed interior cross-section with a height (H) of at least 15 cm and a width (W) of at least 25 cm, and including a floor plate (14), a top plate (11), a front wall (12) and a rear wall (13), and at least part of said cross tube extending above a plane (70) containing axles of said wheels;

first and second rings on opposite sides of said vehicle, each said ring having a central opening defining a door opening, lower portions of said rings forming side support members (21, 22) extending longitudinally at opposite sides of said vehicle;

a plurality of transverse struts interconnecting said rings at locations spaced from said side support members; and force-transmitting junctions (29) interconnecting opposite ends of said cross tube and said side support members.

19. A vehicle according to claim 18 wherein a portion of one of said floor plate (14) and said top plate (11) of said cross tube is detachable, and wherein said cross tube houses at least part of said energy accumulator.

20. A lightweight road vehicle having a frame;

an inner passenger space with laterally adjacent driver's and passenger seats;

wheels and axles coupled to said frame for supporting and permitting rolling motion of said vehicle;

an electric motor coupled to drive at least one of said wheels;

an energy accumulator providing electrical energy for said motor; and a support structure comprising the combination of a cross tube extending across said frame transversely of a normal direction of forward travel of said vehicle within and entirely through said inner passenger space and located beneath and carrying said driver's and passenger seats in a central region of said vehicle between front and rear axles thereof, said tube having an enclosed interior cross-section with a height of at least 15 cm and a width of at least 25 cm, and including a floor plate, a top plate, a front wall and a rear wall forming tube walls, at least three of said four tube walls being interconnected and constructed to resist lateral impact forces imposed on said vehicle, at least part of said cross tube being intersected by a plane containing axles of said wheels, and a portion of one of said floor plate or said top plate of said cross tube being detachable;

said support structure further including at least two side support members extending longitudinally at opposite sides of said vehicle; and force-transmitting junctions interconnecting said cross tube and said side support members, said cross tube housing at least part of said energy accumulator.

* * * * *